(12) United States Patent
Malle

(10) Patent No.: US 10,289,676 B2
(45) Date of Patent: May 14, 2019

(54) METHOD FOR SEMANTIC ANALYSIS OF A TEXT

(71) Applicant: DEADIA, Antony (FR)

(72) Inventor: Jean-Pierre Malle, Saint Michel S/Orge (FR)

(73) Assignee: DEADIA (FR)

( * ) Notice: Subject to any disclaimer, the term of this patent is extended or adjusted under 35 U.S.C. 154(b) by 123 days.

(21) Appl. No.: 15/114,648

(22) PCT Filed: Jan. 28, 2015

(86) PCT No.: PCT/EP2015/051722
§ 371 (c)(1),
(2) Date: Jul. 27, 2016

(87) PCT Pub. No.: WO2015/114014
PCT Pub. Date: Aug. 6, 2015

(65) Prior Publication Data
US 2016/0350277 A1    Dec. 1, 2016

(30) Foreign Application Priority Data
Jan. 28, 2014   (FR) ..................................... 1400201

(51) Int. Cl.
*G06F 17/27* (2006.01)
*G06F 17/30* (2006.01)
*G06F 17/28* (2006.01)

(52) U.S. Cl.
CPC ........ *G06F 17/271* (2013.01); *G06F 17/2785* (2013.01); *G06F 17/3071* (2013.01); *G06F 17/30684* (2013.01); *G06F 17/27* (2013.01); *G06F 17/28* (2013.01); *G06F 17/30* (2013.01)

(58) Field of Classification Search
CPC .......... G06F 17/27; G06F 17/28; G06F 17/30
See application file for complete search history.

(56) References Cited

U.S. PATENT DOCUMENTS

| 6,192,360 B1* | 2/2001 | Dumais | G06F 17/30707 |
| 6,510,406 B1* | 1/2003 | Marchisio | G06F 17/2715 |
| | | | 704/9 |
| 6,990,496 B1* | 1/2006 | McGee, III | G06F 17/30746 |
| 2011/0179032 A1* | 7/2011 | Ceusters | G06F 17/2775 |
| | | | 707/737 |

FOREIGN PATENT DOCUMENTS

| EP | 1462950 | * | 3/2003 |
| EP | 1462950 A1 | | 9/2004 |

(Continued)

OTHER PUBLICATIONS

Lhotska, et al. (Eds.) "Database and Expert Systems Applications," 24th Int. Conf., DEXA 2013—on semantic coefficient.*

(Continued)

*Primary Examiner* — Feng-Tzer Tzeng
(74) *Attorney, Agent, or Firm* — Lerner, David, Littenberg, Krumholz & Mentlik, LLP (57) ABSTRACT

The present invention relates to the field of computer-based semantic understanding. Specifically, it relates to a method for semantic analysis of a natural-language text by data-processing means with a view to the classification thereof.

19 Claims, 2 Drawing Sheets

(56) References Cited

FOREIGN PATENT DOCUMENTS

| EP | 1650680 | A2 | | 4/2006 | | |
|---|---|---|---|---|---|---|
| EP | 1650680 | | * | 12/2009 | | |
| EP | 1650680 | A2 | * | 12/2009 | ......... | G06F 17/3069 |

OTHER PUBLICATIONS

Cuzzocrea, et al. (Eds.) "Model and Data Engineering," $3^{rd}$ Int. Conf., MEDI 2013—on semantic coefficient.*
Apoorv Agarwal et al: "Contextual phrase-level polarity analysis using lexical affect scoring and syntactic N-grams", Proceedings of the 12th Conference of the European Chapter of the Association for Computational Linguistics On, EACL '09, Mar. 30, 2009, pp. 24-32, XP055162924.
Grigori Sidorov et al: "Syntactic Dependency-Based N-grams as Classification Features", Oct. 27, 2012 (Oct. 27, 2012), Advances in Computational Intelligence, Springer Berlin Heidelberg, Berlin, Heidelberg, pp. 1-11, XP047026724.
International Search Report for Application No. PCT/EP2015/051722 dated Mar. 10, 2015.
T Revathi et al: "Sentence Level Semantic Classification of Online Product Reviews of Mized Opinions Using Naive bayes Classifier", Intenrational Journal of Engineering Tmds and Technology, Jan. 1, 2012, pp. 2-3, XP055162814, Retrieved from the Internet: URL:<http://www.ijettjournal.org/volume-3/issue-2/1JETT-V312P213.pdf>, [retrieved on Jan. 16, 2015] the whole document.

* cited by examiner

METHOD FOR SEMANTIC ANALYSIS OF A TEXT

CROSS REFERENCE TO RELATED APPLICATIONS

The present application is a national phase entry under 35 U.S.C. § 371 of International Application No. PCT/EP2015/051722, filed Jan. 28, 2015, which claims priority from French Patent Application No. 1400201, filed Jan. 28, 2014, the disclosures of which are incorporated by reference herein.

GENERAL TECHNICAL FIELD

The present invention relates to the field of computer-based semantic understanding.

More specifically, it relates to a method for semantic analysis of a text in natural language by data processing means, with view to the classification thereof.

STATE OF THE ART

The semantic analysis of a text in natural language aims at establishing the meaning thereof by using the meaning of the words which make it up, following lexical analysis which gives the possibility of breaking down this text by means of a lexicon or a grammar. Humans achieve this unconsciously for understanding the texts which they read, and recent developments aim at giving similar capacities to machines.

For the moment, automated semantic analysis algorithms are known and designed so that a computer may classify a text into several predetermined categories, for example general themes such as "nature", "economy", "literature", etc.

However, this classification proves to be very limited and not very able to evolve. Insofar that the possible selection of diverse categories is often arbitrary, texts located at the boundary of two categories may pose a problem to the algorithms. Further, finer classification strongly degrades the performances of the algorithms and causes errors in appreciation, notably caused by ambiguities due to certain homonyms and certain forms (for example a double negation).

Generally, giving an "absolute" meaning to a text by computer processing is a highly complex operation and is often questionable. For example, determining whether a text assumes a "pro" or "con" position with regard to an opinion is today beyond reach of computer-based semantic analysis.

It would be desirable to have an improved method for semantic analysis of a text by a computer with view to its classification, which is significantly more performing and more reliable than anything which is produced presently, and which is not limited by pre-established semantic models.

PRESENTATION OF THE INVENTION

The present invention proposes a method for semantic analysis of a text in natural language received by a piece of equipment from input means, the method being characterized in that it comprises performing, by data processing means of the piece of equipment, steps for:

(a) Syntactically parsing at least one text portion into a plurality of words;
(b) Filtering words of said text portion with respect to a plurality of lists of reference words stored on data storage means of the piece of equipment, each being associated with a theme, so as to identify:
   The set of the words of said text portion associated with at least one theme,
   The set of the themes of said text portion;
(c) Constructing a plurality of subsets of the set of the words of said text portion associated with at least one theme;
(d) For each of said subsets and for each identified theme, computing:
   a coverage coefficient of the theme and/or a relevance coefficient of the theme depending on the occurrences in said text portion, of reference words associated with the theme;
   at least one orientation coefficient of the theme from words of said text portion not belonging to the subset;
(e) For each of said subsets and for each identified theme, computing a semantic coefficient representative of a meaning level borne by the sub-group depending on said coverage, relevance and/or orientation coefficients of the theme.
(f) Selecting according to the semantic coefficients at least one subset/theme pair.
(g) Classifying the text according to said at least one selected subset/theme pair.

According to other advantageous features and non-limiting features of the invention:

a coverage coefficient of a theme is computed in step (d) like the number N of reference words associated with the theme comprised in said subset;

a relevance coefficient of a theme is computed in step (d) with the formula $N*(1+\ln(R))$, wherein N is the number of reference words associated with the theme comprised in the subset and R is the total number of occurrences in said text portion of reference words associated with the theme;

two orientation coefficients of the theme are computed in step (c), including a certainty coefficient of the theme and a grade coefficient of the theme;

a certainty coefficient of a theme is computed in step (d) as having the value:
   1 if the words not belonging to the subset are representative of an affirmative proximity with the theme;
   −1 if the words not belonging to the subset are representative of a negative proximity with the theme;
   0 if the words not belonging to the subset are representative of an uncertain proximity with the theme;

a grade coefficient of a theme is a positive scalar greater than 1 when the words not belonging to the subset are representative of an amplification of the theme, and a positive scalar of less than 1 when the words not belonging to the subset are representative of an attenuation of the theme;

the method comprises a preliminary step (a0) for parsing the text into a plurality of propositions, each being a text portion for which the steps (a) to (d) of the method are repeated so as to obtain for each proposition a set of coverage, relevance, and/or orientation coefficients associated with the proposition, the method comprising before step (e) a computing step (e0) for each of said subsets and for each identified theme, for at least one proposition of the text of a global coverage coefficient of the theme and/or of a global relevance coefficient of the theme, and of at least one global orientation coefficient of the theme depending on the set of said coefficients associated with a proposition;

a global coverage coefficient of a theme is computed in step (e0) as the sum of the coverage coefficients of the theme associated with a proposition less the number of reference words of the theme present in at least two propositions;

a global relevance coefficient of a theme is computed in step (e0) as the sum of the relevance coefficients of the theme associated with a proposition;

a global orientation coefficient of a theme is computed in step (e0) as the average of the orientation coefficients of the theme associated with a proposition weighted by the associated coverage coefficients of the theme;

step (e0) comprises for each of said subsets and for each theme, the computation of a global divergence coefficient of the theme corresponding to the standard deviation of the distribution of the products of the orientation coefficients by the coverage coefficients associated with each proposition;

a semantic coefficient of a subset A for a theme T is computed in step (e) with the formula $M(A,T)$=relevance coefficient $(A,T)$*orientation coefficient $(A,T)$*$\sqrt{[1+\text{divergence coefficient }(A,T)^2]}$;

the subset/theme pairs selected in step (f) are those such that for any partition of the subset into a plurality of portions of said subset, the semantic coefficient of the subset for the theme is greater than the sum of the semantic coefficients of the sub-portions of the subset for the theme;

groups of subset/reference theme pairs are stored on the data storage means, step (g) comprising the determination of the group(s) comprising at least one subset/theme pair selected in step (f);

step (g) comprises the generation of a new group if no group of subset/reference theme pairs contains at least one subset/theme pair selected for the text;

each subset/reference theme pair is associated with a score stored on the data storage means, the score of a reference couple subset/theme pair decreasing over time but increasing every time this subset/theme pair is selected for a text;

the method comprises a step (h) for suppressing a subset/reference theme pair of a group if the score of said pair passes below a first threshold, or modification on the data storage means (12) of said plurality of lists associated with the themes if the score of said pair passes above a second threshold;

step (g) comprises for each group of subset/reference theme pairs the computation of a dilution coefficient representing the number of occurrences in said text portion of reference words associated with themes of the subset/reference theme pairs present in the text relatively to the total number of reference words associated with said themes;

all the subsets of the set of the words of said text portion associated with at least one theme are constructed in step (c).

According to a second aspect, the invention relates to a piece of equipment comprising data processing means configured for performing, following reception of a text in natural language, a method according to the first aspect of the invention for semantic analysis of the text.

SHORT DESCRIPTION OF THE FIGURES

Other features and advantages of the present invention will become apparent upon reading the description which follows of a preferential embodiment. This description will be given with reference to the appended drawings wherein.

DETAILED DESCRIPTION OF A PREFERRED EMBODIMENT

Architecture

Figure 1:
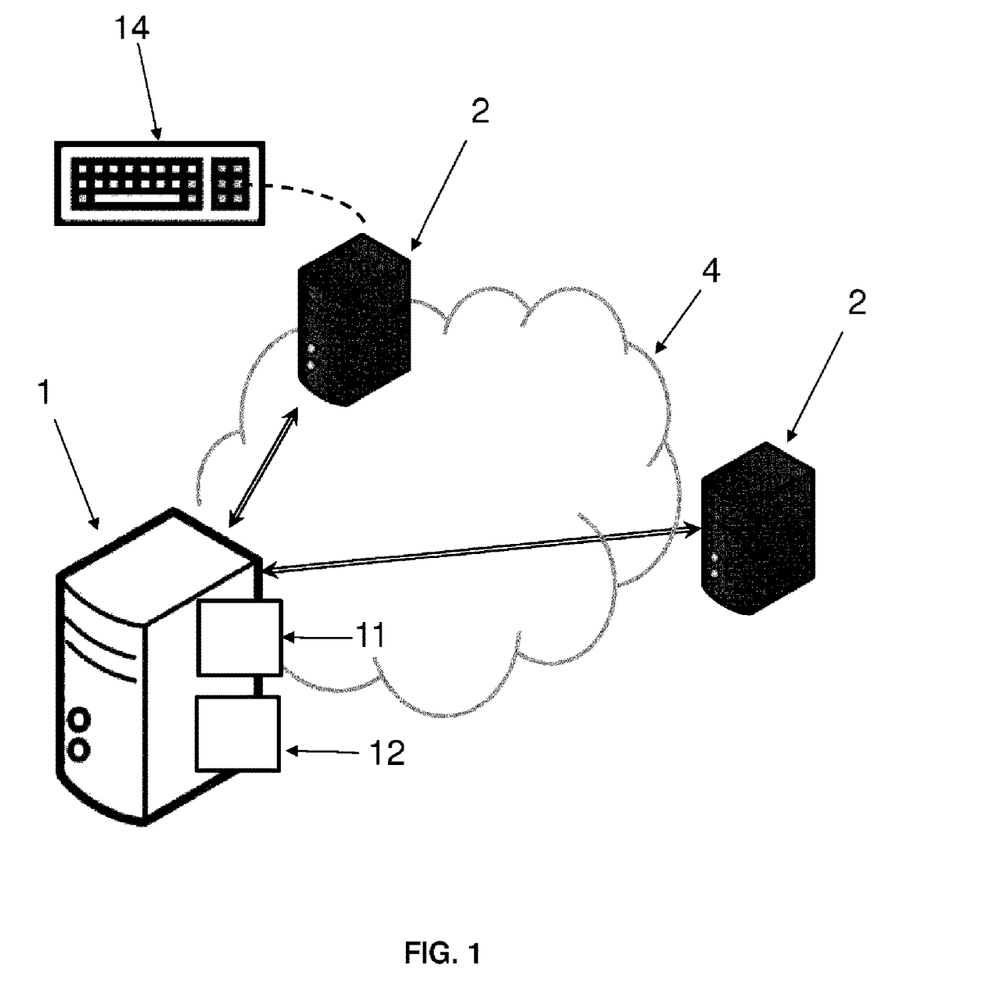
FIG. 1 is a diagram of a network architecture in which the invention is included.

With reference to FIG. 1, the present method is performed by data processing means 11 (which typically consist in one or several processors) of a piece of equipment 1. The latter may for example be one or several servers connected to a network 4, typically an internet network, via which it is connected to clients 2 (for example personal computers (PCs)).

The piece of equipment 1 further comprises means for storing data 12 (typically one or several hard disks).

The Notion of Text

A text here is any message in natural language and having a meaning. The text is received in electronic form, i.e. in a format which may be directly processed by the processing means 11, for example in XML (Extensible Markup Language). It will be understood that by received "from input means 14", is meant a large variety of origins. Generally, the term input means refers to any hardware and/or software means giving the possibility of recovering the text and of sending it to the data processing means 11 in a legible format. The text may be directly typed in by a user, and the input means 14 for example refer to a keyboard and a text processing piece of software. Alternatively, the text may be a scanned paper text and recognized by OCR (optical character recognition), and the input means 14 then refer to a scanner and to a piece of software for processing digital data, or further the text may be dictated and the input means 14 then refer to a microphone and a voice recognition piece of software. Finally, the text may be received for example from a server of the internet network, optionally directly in a legible format. The present method is not limited to any text type. In a connected structure of the type of FIG. 1, the input means are typically those of a client 2 or of another server 1.

The text is structured in sections. The sections may be separated by paragraphs or be simply concatenated. The sections are distinguished from each other by the fact that the exhibited concepts are substantially different. The detection of sections not marked by the author is a complex operation.

A section consists of sentences separated by punctuation (colon, full stop, exclamation mark, question mark, paragraph hyphen, ellipsises, etc.).

A sentence consists of propositions separated by punctuation (coma, semi-colon).

A proposition is a sequence of words separated by spaces.

A word is an ordered set of letters and particular signs (accents, hyphens, etc.).

In certain texts, the punctuations may not be observed. Certain texts may contain abbreviated words or words left out.

In a first step (a), at least one text portion is syntactically parsed into a plurality of words. Advantageously, this sentence portion is a proposition, and the text is first parsed proposition by proposition in a step (a0) before each proposition is in turn parsed into words. Algorithms are known which are capable, notably by means of grammar rules, of identifying propositions. The parsing into propositions may occur following parsing into sentences, itself after parsing into sections. The identification of the words is accomplished by means of the spaces.

Typically, a parser (the engine performing parsing) using punctuation and formatting as a delimiter of propositions may be sufficient if the punctuations are observed.

Within a proposition, the person skilled in the art will for example use a parser applying the following rules:

- replacement of each verb with this verb in the infinitive tense and associating with the latter three indexes (mode, tense, person);
- replacement of each noun with this noun in the singular and association with the latter of two indexes (gender, number);
- replacement of each adjective with this adjective in the masculine singular and association with the latter of two indexes (gender, number);
- preservation of the adverbs;
- suppressions of "embellishing" words of the language (by means of a list);
- declaration of any other term as a proper noun;
- registering each word, its type and its indexes in a list associated with the proposition.

The present rules may be modified or suppressed, other rules may enrich the parser.

Notion of Categories and Themes

A text is classified in one or several "categories" depending on the meaning which it bears. The categories here are moving sets.

As this will be seen later on, the categories are defined as groups of "rings" and may be induced by the appearance of a text falling under a new meaning.

When a category becomes too populated, it is desirable to segment it by reducing the spectrum of the acceptable meanings in each group of texts formed by the splitting of the initial category. Each text group then becomes a category. A category is illustrated by a list of themes.

The theme is the meaning attached to a set of the words (so-called reference words) entering the composition of a proposition, present in a list called a theme list. The theme is attached to one or several categories.

For each theme, the associated list of reference words is stored on the storage means 12 of the piece of equipment 1.

For example, a "motorization" theme may comprise reference words {engine, piston, cylinder, crank shaft, shaft, connecting rod, pedal, power, etc.}, and a "geometry" theme may comprise reference words {straight line, angle, degree, star, rectangle, sphere, cylinder, pyramid, etc.}. It is notably seen that the word "cylinder" has several meanings and is thus related to two themes although they are far from each other.

In the continuation of the present description, the example of a proposition formulated as follows: "the engine comprises three pistons connected to a crank shaft through star-shaped connecting rods forming an angle of 120° pairwise which reacts to minimum pressure on the acceleration pedal", or slight variations of this proposition.

In step (b), at least one theme is identified from among the plurality of themes each associated with a list of reference words of the stored theme.

In particular, it is sufficient that a reference word associated with the theme be present so that the theme is associated therewith. Alternatively, at least two (or even more) words are required.

In our example:

- the group of words {engine, piston, crank shaft, connecting rod, pedal} allows detection of a "motorization" theme.
- the group of words {angle, 120°, star} allows detection of a "geometry" theme.

The set of the words of the analyzed text portion associated with at least one theme is also identified. Here, these are {engine, piston, crank shaft, connecting rod, pedal, angle, 120°, star}

Semantic Rings

Let V be a vocabulary of Nv words (in particular the set of the reference words of at least one theme).

Let T be a subset of V of Nt words (in particular the set of reference words present in at least one theme), Nt≤Nv.

Let P be a proposition of Np words, such that Np≤Nv.

Let Q be the group of Nq words common to P and to T (these are words of the proposition belonging to at least one theme), Nq≤Np.

Let P(P) be the set of parts of P and P(Q) the set of parts of Q.

By design, P(P) and P(Q) are unit commutative rings provided with two operators:

- a symmetrical difference operator noted as $\Delta$ (relatively to two sets A and B, the symmetrical difference of A and B is the set containing the elements contained in A but not in B, and the elements contained in B and not in A); and
- an intersection operator noted as &.

P(P) is isomorphous to Z/NpZ and P(Q) is isomorphous to Z/NqZ.

$\forall A \in P(P)$, P(A) is included in P(P) and A is also a unit commutative ring. A contains all the complete or partial combinations of a group of words. A is called a "semantic ring". From the set of the words of a proposition belonging to a theme, a semantic ring is defined by a subset of this set.

For example, if "this vehicle is large and blue" is a proposition, the semantic rings of this proposition are noted as { }, {vehicle}, {large}, {blue}, {vehicle, large}, {vehicle, blue}, {vehicle, large, blue}. It is important to understand that each ring is not the simple list of words which make it up but is actually the set of the sets comprising $i \in [[0,K]]$ of these words (which are other semantic rings). For example, the ring defined by vehicle and large in reality corresponds to the set {{ }; {vehicle}; {large}; {vehicle, large}}.

A ring is said to be centered if there are no pair of words which it contains belonging to two different themes (but it may contain words not belonging to any theme).

A ring is said to be regular if it also belongs to P(Q), i.e. all the words which it contains belong to one of the themes.

In a step (c), the method comprises the construction of a plurality of subsets from the set of the words of said text portion associated with at least one theme, in other words, the regular semantic rings and advantageously the method comprises the construction of the totality of these rings.

If the set of the words associated with at least one theme comprises K elements, there are $2^K$ constructed rings.

Semantic Matrices

In step (d), a representation of the "meaning" of the semantic rings of a text portion (which, as explained, is typically a proposition) is determined by the data processing means 11 of the piece of equipment 1. This representation assumes the form of a matrix formed with vectors attached to the themes and comprising several dimensions and stored in the data storage means 12 of the piece of equipment. This matrix is called a "semantic matrix" (or meaningful matrix). Under the assumption of processing, proposition after proposition, a sequence of semantic matrices is determined, and in a step (e0) a global semantic matrix of the text is determined according to the semantic matrices of the rings of the propositions.

A semantic matrix comprises at least two dimensions, advantageously three, or even four: the coverage, the relevance (at least one from among both of these is required), certainty, grade (both of the latter may be grouped into a single dimension, orientation). The global matrix of a text may comprise a fifth dimension (divergence).

Coverage Coefficient of a Theme

The method comprises for each sub-group (i.e. semantic ring) and each identified theme, the computation of a coverage coefficient of the theme and/or of a relevance coefficient of the theme (advantageously both), according to the occurrences in the ring of reference words associated with the theme.

The coverage coefficient of a theme embodies the proximity between the ring and the theme, and is represented by an integer, typically the number N of words of the theme comprised in the ring. It is possible to add weights to it (for example to certain "essential" words of the theme).

In the preceding example, the proximity between the proposition and the "motorization" theme is stronger than that with the "geometry" theme (a coefficient of five versus three).

Relevance Coefficient of a Theme

The relevance coefficient is computed by the data processing means 11 like the coverage coefficient but by taking into account the total number of occurrences of the words of the theme.

In particular, if N is the number of words of the theme contained in the ring, or each word being counted only once (in other words the coverage coefficient of the theme) and R is the number of words of the theme contained in the ring, or each word counts as many times as it occurs in the proposition (total number of occurrences, which increases with the length of the proposition), the relevance coefficient is for example given by the formula $N*(1+\ln(R))$, with ln being the natural logarithm.

The computation of a relevance coefficient is not limited to this formula, and one skilled in the art may for example use the formulae $ch(R/N)$ with ch being the hyperbolic cosine, or further $1/\pi * a\,\tan(R/N)$ with a tan being the arc tangent, depending on the number and the size of the existing themes. Each of these formulae may be normalized.

The use of the arc tangent attenuates the effect of large values of R, while on the contrary, the hyperbolic cosine enhances the effect of large values of R.

Certainty Coefficient of a Theme

The method also comprises the computation, always for each sub-group (i.e. semantic ring) and each identified theme, of at least one orientation coefficient of the theme from the words of said text portion not belonging to the ring (in particular those not belonging to any ring).

In particular, two orientation coefficients of the theme are computed in step (d), including a certainty coefficient of the theme and a grade coefficient of the theme.

The certainty is borne by a set of the words, the order and the nature of which may radically change the meaning borne by the proposition. These are typically words such as negations, punctuation, interrogative/negative words, one list of which may be stored on the data storage means 12. The position of these words relatively to each other (typically of certain forms) moreover gives clues(indexes) on the certainty.

According to these words, the proximity may be affirmative, negative or uncertain. In the preceding example, the proximity is affirmative (failing words modifying the certainty).

By comparison, in a proposition which would be formulated as "no engine comprising any connecting rod or any piston equips this pedal vehicle", the motorization is an anti-theme, revealed by the repeated words of "no", "nor" and "does not".

The proximity between this text and the theme of "motorization" is negative.

Still by comparison, in the example: "Would this vehicle be equipped with a piston engine and a crankshaft with connecting rods?", the proximity between the text and the category of "motorization" is interrogative because of the interrogative form and the presence of the question mark.

The certainty may thus be represented by three values:
1 for affirmative
−1 for negative
0 for uncertain (intertwined interrogative, interro-negative, affirmative and negative, etc.)

Grade Coefficient of a Theme

The grade is borne by a set of the words for which the order and the nature may alter the meaning borne by the proposition. This alteration may be a reinforcement or a weakening of the proximity with the theme, for example by means of adverbs such as "certainly", "surely", "likely", "possibly". Like for the grade, it is possible to store on the storage means 12 a list of characteristic words of a reinforcement or a weakening of the proximity with a theme. The data processing means 11 compares the words not associated with the theme with this list and infers therefrom the value of the grade coefficient, which in particular is a positive scalar (greater than 1 for reinforcement and less than 1 for weakening).

In the example: "This engine surely comprises a crankshaft and connecting rods", the grade is a reinforcement of the theme (by means of "surely"), and the coefficient is for example 1.5.

In the example: "Matthew understands that the engine contains a crankshaft and connecting rods", the grade is a weakening of the theme (by means of "understands"), and the coefficient is for example 0.75.

It should be noted that each word representative of a grade may be stored associated with a coefficient, the grade coefficient for the proposition being for example the product of the coefficients of the words found in the proposition. Alternatively, the grade coefficient for the proposition may be the sum of the coefficients of the words found in the proposition.

The table below gives two examples of sets of coefficients of a few words bearing grades, as well as in a composition by a product (left column) and by a sum (right column). It will be understood that the invention is not limited to any method for computing the grade coefficient.

| | GRADE | |
| --- | --- | --- |
| TERM | Example 1 | Example 2 |
| Much more, a lot, enormously | 2 | +20% |
| More, a little more, twice more | 1.25 | +10% |
| Little, less, a little less | 0.8 | −10% |
| Very little, practically no | 0.5 | −20% |

Orientation Coefficient of a Theme

The grade and certainty coefficients may form two distinct dimensions of the semantic matrix, or be processed together like an orientation coefficient ("orienter").

Perhaps, it is calculated like the product of the certainty and grade coefficients. Indeed, both of these concepts are independent. The proximity to a theme may for example be reinforced in the negative by a formulation such as "the vehicle certainly does not comprise an engine", which will correspond for example to a coefficient of −1.75.

The orientation coefficient is thus typically a real number:
<0 for the negative certainty
>0 for the affirmative certainty
0 for uncertainty
And for which the absolute value is
>1 for a reinforcement
<1 for a relativization
=1 for a neutral orientation At the end of step (d), the preferentially obtained semantic matrix has a structure of the type

| Theme 1 | Theme 2 | Theme 3 | Theme i |
|---|---|---|---|
| Coverage 1 | Coverage 2 | Coverage 3 | Coverage i |
| Relevance 1 | Relevance 2 | Relevance 3 | Relevance i |
| Orienter 1 | Orienter 2 | Orienter 3 | Orienter i |

Composition of Semantic Matrices

As explained above, a text is formed of several sentences themselves formed with several propositions. A semantic matrix is advantageously generated for a ring for each proposition.

In a step (e0), the semantic matrices of a ring are combined into a global matrix: a global coverage coefficient of the theme and/or a global relevance coefficient of the theme and at least one global orientation coefficient of the theme is calculated according to the set of said coefficients associated with a proposition calculated by the data processing means 11 for each ring and each identified theme for at least one proposition of the text.

The matrices of two propositions are complementary if they deal with different themes. The meaning matrix of the set of both propositions consists of the juxtaposition of both matrices (since no theme is common thereto).

The matrices of two propositions are consistent if they deal with themes common with similar orienters.

The matrices of two propositions are opposed if they deal with themes common with opposite orienters (with different signs, i.e. the difference deals with the certainty coefficient of the theme).

In the general case, two matrices A and B deal with certain common themes and with different other themes. The resulting matrix S then consists of one column per theme belonging to either one of the propositions.

For example, the following rules may apply to the compositions of two columns for a same theme:

a global coverage coefficient of a theme is computed as the sum of the coverage coefficients of the theme associated with a proposition minus the number of reference words of the theme present in at least two propositions (in other words, each word should only be counted twice). The coverage of the sum is thus comprised between the largest of the coverages (cases when all the found reference words of the theme are also in the other), and the sum (cases when no reference word is common to both theme coverages). It should be noted that the global coverage coefficient may be easily computed again like the number Nmax of words of the theme contained in the whole of the propositions);

a global relevance coefficient of a theme is computed as the sum of the relevance coefficients of the theme associated with a proposition (since multiple occurrences are taken into account);

a global orientation coefficient of a theme is computed as the average of the orientation coefficients of the theme associated with a proposition weighted by the associated coverage coefficients of the theme. For example, the global orientation coefficient of the text S formed with propositions A and B is given by the formula OS=(OA*CA+OB*CB)/CS.

Moreover, "theme divergence" is defined as representing the variations in meaning for a theme in a text.

Advantageously, the step (e0) thus comprises for each theme, the computation of a global divergence coefficient of the theme. It is for example computed as being the standard deviation of the distribution of the products of the orienters by the coverages of the relevant propositions reduced to the holistic product of the orienter by the coverage of the global text.

A text with strong divergence is a text wherein the subject dealt with by the theme is tackled by interrogations, comparisons, confrontations. A text with low divergence is a text constantly having the same view angle.

Increasing and Decreasing Semantic Rings

The notion of an increasing or decreasing semantic ring is relative to a morphism, giving the possibility of computing a "semantic coefficient", representative of a meaning level borne by the sub-group depending on said coverage, relevance and/or orientation coefficients of the theme, in particular the global coefficients.

This coefficient is computed by the data processing means in step (e) of the method.

For example, let M be the morphism of $P(P) \rightarrow R$ such as $\forall A \in P(P)$, with $T \in P(V), M(A,T)$=relevance$(A,T)$*orienter$(A,T)$*$\sqrt{[1+\text{divergence}(A,T)^2]}$.

M(A,T) is the semantic coefficient of the ring A of the proposition P relatively to the theme T according to the vocabulary V.

M(A) is the semantic coefficient of the ring A of the proposition P relatively to all the themes according to the vocabulary V.

Alternatively, morphisms M are possible (in particular in an embodiment not comprising the computation of a divergence coefficient) such as $\forall A \in P(P)$, with $T \in P(V), M(A,T)=$
 [relevance$(A,T)]^2$*orienter$(A,T)$, or further $\forall A \in P(P)$, with $T \in P(V), M(A,T)$=relevance$(A,T)$*coverage$(A,T)$ All these formulae may also be normalized.

Regardless of the selected morphism, the semantic coefficient gives the possibility of selecting the most meaningful rings/theme pairs in a step (f). In particular, these may be those for which the coefficient is the highest, but alternatively the "growth" criterion of semantic rings may be used.

One designates as increasing semantic ring according to M, any element A of P(Q) for which:
 $\forall A' \in P(A)$,
 $\exists T, M(A,T) > M(A',T) + M(A' \Delta A, T)$
 With card $(A) > 1$ In other words, an increasing (growing) semantic ring is a ring bearing a greater meaning than the sum of the meanings of its parts. To state this again once more, there exists a theme such that for any partition of the ring, the sum of the semantic coefficients of the parts of the partition of the ring relatively to this theme is smaller than the semantic coefficient of the entire ring relatively to this theme.

Oppositely, the other semantic rings are said to be decreasing semantic rings.

Advantageously, the subset/theme pairs selected in step (f) are those for which the ring is increasing for this theme.

The selection of the morphism is determining for selecting the semantic rings. A too loose morphism will result in that all the rings are increasing semantic rings. A too strict morphism will lead to the absence of increasing semantic rings.

In order to illustrate this notion of increasing/decreasing rings, in the proposition "this vehicle is large inside and small outside", the rings {vehicle, large} and {vehicle, small} are more meaningful than the global ring {vehicle, large, small}, since the simultaneous presence of the terms large and small lower the orienter. The ring {vehicle, large, small} is therefore a decreasing ring.

In the proposition: "this vehicle is large and blue", the rings {vehicle, large} and {vehicle, blue} are less meaningful than the global ring {vehicle, large, blue}. The latter is increasing.

The union of two decreasing semantic rings is a decreasing semantic ring. The union of a decreasing semantic ring and of an increasing semantic ring is a decreasing semantic ring. The union of two increasing semantic rings is either an increasing, or decreasing semantic ring. The increasing nature is recessive towards union.

An expressive semantic ring is a set of the words with a cultural meaning superior to that of the union of its parts.

For example in the expression: "this vehicle is a real bomb", the expressive ring {vehicle, bomb} associated with a ("real") reinforcement grade has an expressive meaning not present in the singlet rings {vehicle} and {bomb} and not present in the decreasing ring {vehicle, bomb}.

An expressive ring A is a decreasing ring which has become an increasing one by grade reinforcement (i.e. by a high grade coefficient due to the presence of the term "real" causing a high orienter). The morphism M then has a discontinuity in the vicinity of A.

It should be noted that even before performing step (f), certain filters may suppress certain rings according to parameterization of the engine.

It should be noted that a notion of connectedness between rings and themes may be monitored by data processing means 11. A ring strongly connected to a theme will always be selected in a pair with this theme and never with another one (see later on).

Classification of the Text

Figure 2:
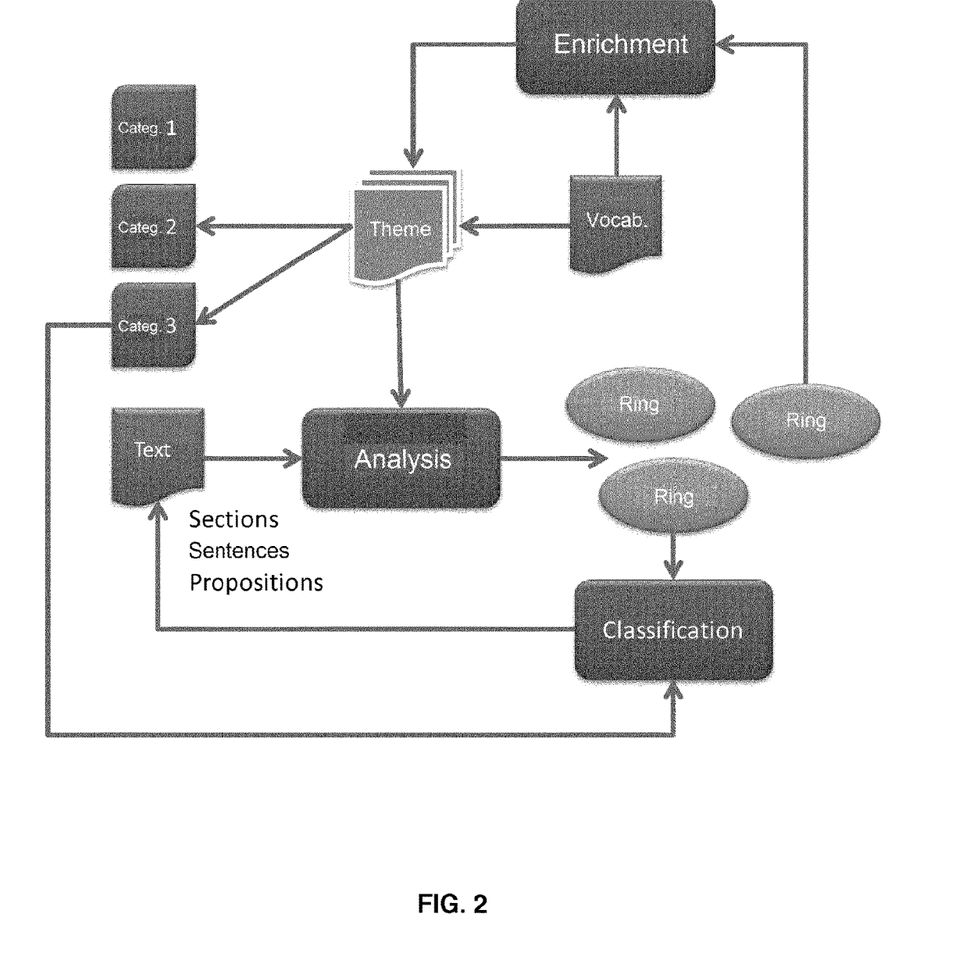
FIG. 2 is a diagram schematically illustrating the steps of the semantic analysis method according to the invention.

A global diagram of the semantic analysis method according to the invention is illustrated by FIG. 2.

The first part, which corresponds to the steps (a) to (f) already described, is performed by a block called the analyzer giving the possibility of selecting the representative rings/themes pairs of the meaning of the text.

In a step (g), a classifier associates the categories with the texts by means of the selected rings. In particular, the categories correspond to groups of subset/reference theme pairs, are stored on the data storage means 12, and the categories in which the text is classified are those comprising at least one subset/theme pair selected in step (f).

Other parameters may contribute to the classification, such as the "dilution". Step (g) may thus comprise the computation of a so-called dilution coefficient which represents the number of occurrences of terms of the themes related to the determined category(ies) (in other words the themes of the pairs of the groups associated with the categories), present in the text added to the total number of terms of said themes. It is then stated that the text is of category X according to dilution D.

For the sake of optimization, an estimation of these parameters and notably of the dilution coefficient may take place earlier in the method.

Learning and Enrichment

As explained, the categories are not fixed and may evolve. In particular new categories may be generated and others segmented.

If no category is retained, a new category may be generated bearing a new meaning: a new group is generated if no group of subset/reference theme pairs contains at least one subset/theme pair selected for the text. The subset/theme pairs become the reference ones of this group.

When a category becomes too populated, a parameterizable segmentation splits it into two or several categories.

Moreover, the rings of propositions not processed by the classification and fitting certain (score) criteria may be placed in a queue stack.

Thus, each subset/reference theme pair may be associated with a score stored on the data storage means 12, the score of a subset/reference theme pair decreasing over time (for example according to hyperbolic damping) but increasing every time this subset/theme pair is selected for a text.

In other words, the enrichment is based on two simultaneous mechanisms:

The "score" of a ring/theme pair increases every time a same ring is derived from the analysis The score of a ring/theme pair is eroded over time according to hyperbolic damping.

And the method may then comprise a step (h) for suppressing a subset/reference theme pair of a group if the score of said pair passes below a first threshold, or modification on the data storage means 12 of said plurality of lists associated with the themes if the score of said pair passes above a second threshold.

In particular, if the score exceeds the second threshold, several cases may occur according to the "connectedness" between the ring and the theme, as mentioned earlier.

The connectedness between a ring and a theme may actually be represented by a coefficient representing for each theme the occurrence frequency of this theme from among the themes such that the associated ring/theme pair has already been selected. In other words, the connectedness between a ring and a theme is for example given as the score of this ring/theme pair over the sum of the scores associated with pairs of this ring with a reference theme.

The different cases which may occur are:
the rings unconnected to the themes give rise to new themes (generation of a new theme for which the associated word list is defined by the ring of the pair for which the score has exceeded the second threshold);
the rings strongly connected to a theme (for example with a connectedness of more than 90%) are merged in the connected theme (for example, if a ring is very close to a theme but comprises an extra word, this word ends up by being added to the list of words associated with the theme).

Conversely, a strongly eroded ring (score passing below the first threshold) disappears from the stack. The two thresholds may be manually defined depending on the "sensitivity", i.e. the desired evolution level of the system. Close thresholds (first high threshold and/or second low threshold) cause a strong renewal of the themes and categories.

The invention claimed is:
1. A method for semantic analysis of a text in natural language received by a piece of equipment from input means, the method being characterized in that it comprises performing, by data processing means of the piece of equipment, steps for:
  (a) Syntactically parsing at least one text portion into a plurality of words;
  (b) Filtering words of said text portion with respect to a plurality of a list of reference words stored on data storage means of the piece of equipment, each being associated with a theme, so as to identify:
    The set of the words of said text portion associated with at least one theme,
    The set of the themes of said text portion;
  (c) Constructing a plurality of subsets of the set of the words of said text portion associated with at least one theme;
  (d) For each of said subsets and for each identified theme, computing:
    a coverage coefficient of the theme and/or a relevance coefficient of the theme depending on the occurrences in said text portion, of reference words associated with the theme;
    at least one orientation coefficient of the theme from the words of said text portion not belonging to the subset;
  (e) For each of said subsets and for each identified theme, computing a semantic coefficient representative of a meaning level borne by a sub-group depending on said coverage, relevance and/or orientation coefficients of the theme;
  (f) Selecting according to the semantic coefficients at least one subset/theme pair;
  (g) Classifying the text according to said at least one selected subset/theme pair,
    wherein the method comprises a preliminary step (a0) for parsing the text into a plurality of propositions, each being a text portion for which the steps (a) to (d) of the method are repeated so as to obtain for each proposition a set of coverage, relevance, and/or orientation coefficients associated with the proposition, the method comprising before step (e) a computing step (e0) for each of said subsets and for each identified theme, for at least one proposition of the text of a global coverage coefficient of the theme and/or of a global relevance coefficient of the theme, and of at least one global orientation coefficient of the theme depending on the set of said coefficients associated with a proposition.

2. The method according to claim 1, wherein a coverage coefficient of a theme is computed in step (d) like the number N of reference words associated with the theme comprised in said subset.

3. The method according to claim 1, wherein a relevance coefficient of a theme is computed in step (d) with the formula $N*(1+\ln(R))$, wherein N is the number of reference words associated with the theme comprised in the subset and R is the total number of occurrences in said text portion of reference words associated with the theme.

4. The method according to claim 1, wherein two orientation coefficients of the theme are computed in step (c), including a certainty coefficient of the theme and a grade coefficient of the theme.

5. The method according to claim 4, wherein a certainty coefficient of a theme is computed in step (d) as having the value:
  1 if the words not belonging to the subset are representative of an affirmative proximity with the theme;
  −1 if the words not belonging to the subset are representative of a negative proximity with the theme;
  0 if the words not belonging to the subset are representative of an uncertain proximity with the theme.

6. The method according to claim 4, wherein a grade coefficient of a theme is a positive scalar greater than 1 when the words not belonging to the subset are representative of an amplification of the theme, and a positive scalar of less than 1 when the words not belonging to the subset are representative of an attenuation of the theme.

7. The method according to claim 1, wherein a global coverage coefficient of a theme is computed in step (e0) as the sum of the coverage coefficients of the theme associated with a proposition less the number of reference words of the theme present in at least two propositions.

8. The method according to claim 1, wherein a global relevance coefficient of a theme is computed in step (e0) as the sum of the relevance coefficients of the theme associated with a proposition.

9. The method according to claim 1, wherein a global orientation coefficient of a theme is computed in step (e0) as the average of the orientation coefficients of the theme associated with a proposition weighted by the associated coverage coefficients of the theme.

10. The method according to claim 1, wherein step (e0) comprises for each of said subsets and for each theme, the computation of a global divergence coefficient of the theme corresponding to the standard deviation of the distribution of the products of the orientation coefficients by the coverage coefficients associated with each proposition.

11. The method according to claim 10, wherein a semantic coefficient of a subset A for a theme T is computed in step (e) with the formula $M(A,T)=$relevance coefficient $(A,T)$ *orientation coefficient $(A,T)*\sqrt{[1+\text{divergence coefficient} (A,T)^2]}$.

12. The method according to claim 1, wherein the subset/theme pairs selected in step (f) are those such that for any partition of the subset into a plurality of portions of said subset, the semantic coefficient of the subset for the theme is greater than the sum of the semantic coefficients of the sub-portions of the subset for the theme.

13. The method according to claim 1, wherein groups of subset/reference theme pairs are stored on the data storage means, step (g) comprising the determination of group(s) comprising at least one subset/theme pair selected in step (f).

14. The method according to claim 13, wherein the step (g) comprises the generation of a new group if no group of subset/reference theme pairs contains at least one subset/theme pair selected for the text.

15. The method according to claim 13, wherein each subset/reference theme pair is associated with a score stored on the data storage means, the score of a subset/reference theme pair decreasing over time but increasing every time this subset/theme pair is selected for a text.

16. The method according to claim 15, comprising a step (h) for suppressing a subset/reference theme pair of a group if the score of said pair passes below a first threshold, or modification on the data storage means of said plurality of lists associated with the themes if the score of said pair passes above a second threshold.

17. The method according to claim 13, wherein step (g) comprises for each group of subset/reference theme pairs the computation of a dilution coefficient representing the number of occurrences in said text portion of reference words associated with themes of the subset/reference theme pairs present in the text relatively to the total number of reference words associated with said themes.

18. The method according to claim 1, wherein all the subsets of the set of the words of said text portion associated with at least one theme are constructed in step (c).

19. A piece of equipment comprising data processing means configured for performing, following reception of a text in natural language, steps of:
   (a) Syntactically parsing at least one text portion into a plurality of words;
   (b) Filtering words of said text portion with respect to a plurality of a list of reference words stored on data storage means (12) of the piece of equipment (1), each being associated with a theme, so as to identify:
      The set of the words of said text portion associated with at least one theme,
      The set of the themes of said text portion;
   (c) Constructing a plurality of subsets of the set of the words of said text portion associated with at least one theme;
   (d) For each of said subsets and for each identified theme, computing:
      a coverage coefficient of the theme and/or a relevance coefficient of the theme depending on the occurrences in said text portion, of reference words associated with the theme;
      at least one orientation coefficient of the theme from the words of said text portion not belonging to the subset;
   (e) For each of said subsets and for each identified theme, computing a semantic coefficient representative of a meaning level borne by a sub-group depending on said coverage, relevance and/or orientation coefficients of the theme;
   (f) Selecting according to the semantic coefficients at least one subset/theme pair;
   (g) Classifying the text according to said at least one selected subset/theme pair,
      wherein the method comprises a preliminary step (a0) for parsing the text into a plurality of propositions, each being a text portion for which the steps (a) to (d) of the method are repeated so as to obtain for each proposition a set of coverage, relevance, and/or orientation coefficients associated with the proposition, the method comprising before step (e) a computing step (e0) for each of said subsets and for each identified theme, for at least one proposition of the text of a global coverage coefficient of the theme and/or of a global relevance coefficient of the theme, and of at least one global orientation coefficient of the theme depending on the set of said coefficients associated with a proposition.

* * * * *